(12) United States Patent
Ben-Itzhak et al.

(10) Patent No.: US 9,954,799 B2
(45) Date of Patent: Apr. 24, 2018

(54) ADAPTIVE SERVICE CHAIN MANAGEMENT

(71) Applicant: International Business Machines Corporation, Armonk, NY (US)

(72) Inventors: Yaniv Ben-Itzhak, Kiryat-Yam (IL); Amitabha Biswas, San Francisco, CA (US); Anna Levin, Haifa (IL); Eran Raichstein, Yokneam Illit (IL)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 14/711,823

(22) Filed: May 14, 2015

(65) Prior Publication Data

US 2016/0337202 A1 Nov. 17, 2016

(51) Int. Cl.
| | | |
|---|---|---|
| *G06F 15/177* | (2006.01) | |
| *H04L 12/935* | (2013.01) | |
| *H04L 12/741* | (2013.01) | |
| *H04L 12/24* | (2006.01) | |
| *H04L 12/715* | (2013.01) | |
| *H04L 12/703* | (2013.01) | |

(52) U.S. Cl.
CPC .......... *H04L 49/30* (2013.01); *H04L 41/5025* (2013.01); *H04L 41/5051* (2013.01); *H04L 41/5058* (2013.01); *H04L 45/28* (2013.01); *H04L 45/64* (2013.01); *H04L 45/745* (2013.01)

(58) Field of Classification Search
CPC ..... H04L 41/20; H04L 43/045; H04L 45/745; H04L 49/30
USPC .................................................. 709/203, 221
See application file for complete search history.

(56) References Cited

U.S. PATENT DOCUMENTS

| 7,721,150 B2 | 5/2010 | Belyakov et al. |
| 7,760,626 B2 | 7/2010 | Malpani et al. |
| 7,992,039 B2 | 8/2011 | Belyakov et al. |
| 8,422,379 B2 | 4/2013 | Xu et al. |
| 8,429,452 B2 | 4/2013 | Belyakov et al. |

(Continued)

FOREIGN PATENT DOCUMENTS

| CN | 103179046 A | 6/2013 |
| WO | 2013184846 A1 | 12/2013 |

OTHER PUBLICATIONS

Tail-f, "Tail-f NCS Dynamic Service Chaining"; Service Chaining: What and Why? Sep 2013; pp. 1-7.*

(Continued)

*Primary Examiner* — Frantz Jean
(74) *Attorney, Agent, or Firm* — Brian M. Restauro; Noah A. Sharkan

(57) ABSTRACT

Embodiments of the present invention provide methods, computer program products, and systems for fulfilling a service chain request. Embodiments of the present invention can be used to collect network data of a plurality of instances of services and connections between the plurality of instances of services and redefine service chains to direct flow to an alternative instance of a service responsive to determining that an instance of a service in a service chain has become inaccessible. Embodiments of the present invention can be used to fulfill a service chain request and avoid one or more instances of services (and/or connections there between) that could cause a delay between transmitting data packets through the service chain.

20 Claims, 5 Drawing Sheets

(56) References Cited

U.S. PATENT DOCUMENTS

| | | | |
|---|---|---|---|
| 8,595,364 | B2 | 11/2013 | Yahalom et al. |
| 8,601,126 | B2 | 12/2013 | Bruno et al. |
| 8,611,232 | B2 | 12/2013 | Xu et al. |
| 8,654,765 | B2 | 2/2014 | Singh et al. |
| 8,839,254 | B2 | 9/2014 | Horvitz et al. |
| 8,873,424 | B2 | 10/2014 | Tanaka et al. |
| 2013/0044758 | A1 | 2/2013 | Nguyen et al. |
| 2013/0114409 | A1 | 5/2013 | Iovanna et al. |
| 2013/0132564 | A1 | 5/2013 | Ciordas et al. |
| 2013/0215887 | A1 | 8/2013 | Diab |
| 2013/0272305 | A1 | 10/2013 | Lefebvre et al. |
| 2013/0336107 | A1 | 12/2013 | Vasseur et al. |
| 2014/0050223 | A1 | 2/2014 | Foo et al. |
| 2014/0078895 | A1 | 3/2014 | Iovanna et al. |
| 2014/0126423 | A1 | 5/2014 | Vasseur et al. |
| 2014/0204761 | A1 | 7/2014 | Durrani et al. |
| 2014/0334295 | A1 | 11/2014 | Guichard et al. |
| 2014/0348007 | A1 | 11/2014 | Beecroft |
| 2014/0355436 | A1 | 12/2014 | Zhang et al. |
| 2015/0333930 | A1* | 11/2015 | Aysola ................ H04L 63/0471 370/392 |
| 2015/0381493 | A1* | 12/2015 | Bansal .................... H04L 45/30 370/392 |
| 2016/0149784 | A1* | 5/2016 | Zhang .................. H04B 1/0003 370/229 |

OTHER PUBLICATIONS

Aversa et al., "Load balancing a cluster of web servers: using distributed packet rewriting", Conference Proceedings of the 2000 IEEE International Performance, Computing, and Communications Conference, IPCCC '00, DOI: 10.1109/PCCC.2000.830297, pp. 24-29.

Bestavros et al., "Distributed packet rewriting and its application to scalable server architectures," in Proceedings IEEE 1998 Sixth International Conference on Network Protocols, DOI: 10.1109/ICNP.1998.723750, pp. 290-297.

Jiang et al., "An Architecture of Service Function Chaining", draft-jiang-sfc-arch-01.txt, Internet Working Group, Feb. 14, 2014, Expires: Aug. 2014, pp. 1-12.

Katz et al., "A Scalable HTTP Server: The NCSA Prototype", National Center for Supercomputing Applications, University of Illinois, Urbana-Champaign, IL 61820, provided by inventors on Mar. 19, 2014, pp. 1-10.

Liu et al., "Greening Geographical Load Balancing", SIGMETRICS'11, Jun. 7-11, 2011, San Jose, California, USA, pp. 233-244, Copyright 2011 ACM 978-1-4503-0262-3/11/06.

Mogul, Jeffrey C., "Network Behavior of a Busy Web Server and its Clients", WRL Research Report 95/5, Oct. 1995, Digital Western Research Laboratory, 250 University Avenue, Palo Alto, California, 94301, USA, pp. 1-58.

Singh et al., "Server-Storage Virtualization: Integration and Load Balancing in Data Centers", provided by inventors on Mar. 19, 2014, pp. 1-12.

Cisco, "Data Center: Load Balancing Data Center Services SRND", Cisco Systems, Solutions Reference Newark Design, Mar. 2004, Customer Order No. 956980, pp. i-IN-6, Copyright © 2004, Cisco Systems, Inc.

Cisco, "Enabling Service Chaining on Cisco Nexus 1000V Series", Cisco, White Paper, pp. 1-25, © 2013, Cisco and/or its affiliates, All rights reserved.

Huawei, "Enabling Agile Service Chaining with Service Based Routing", pp. 1-8, Copyright © Huawei Technologies Co., Ltd. 2013, All rights reserved.

Tail-F, "Tail-F NCS Dynamic Service Chaining", Service Chaining: What and why?, Sep. 2013, pp. 1-7.

* cited by examiner

ADAPTIVE SERVICE CHAIN MANAGEMENT

TECHNICAL FIELD

The present invention relates generally to the field of software-defined networking, and more particularly to software-defined networking controllers.

BACKGROUND

A data processing environment comprises a variety of hardware, software, and firmware networking components. A physical network, also called an underlay, is a network defined using such components. An example of a networking component in a physical network is a computing node. A computing node is a device that can offer a service (e.g., compression, encryption, firewall, decryption, etc.) and channel incoming data from any of multiple input ports to the specific output port that will take the data toward its intended destination. Multiple computing nodes can form a service chain.

Techniques are available presently to construct a logical network, also known as a software defined network (SDN) overlay (hereinafter interchangeably, "SDN" or "overlay"), from networking components of a physical network. Essentially, networking components are abstracted into corresponding logical or virtual representations, and the abstractions are used to define the SDN. In other words, an SDN is a logical network formed and operated using logical representations of underlying networking components.

Physical networks usually exist within the demarcated boundary of the data processing environment whose networking components are utilized in the physical network. Unlike a physical network, an SDN can be designed to span across one or more data processing environments. For example, while a physical network may be contained within a datacenter, an SDN may span across one or more datacenters.

As an example, a logical representation of a hypervisor can participate in an SDN, such that a function attributed to the logical representation of the hypervisor in the SDN is actually performed by the underlying hypervisor component in the underlay. Similarly, a logical representation of a networking gateway can participate in an SDN, such that a function attributed to the logical representation of the networking gateway in the SDN is actually performed by the underlying networking gateway component in the underlay.

In an SDN, because the actual networking components that perform the networking functions are abstracted into logical entities representing the networking functionality offered by those components and not the actual implementations of those functionalities, something is needed to direct those networking functionalities into a functioning logical network. An SDN controller is a component that manages and operates the logical networking components within an SDN. For example, an SDN controller manages flow entries of computing nodes forming a service chain in an underlay network.

SUMMARY

In one embodiment of the present invention, a method for fulfilling a service chain request is provided. The method includes collecting network data of a plurality of instances of services and connections between the plurality of instances of services. The method further includes, receiving a service chain request requiring a first service chain. The method further includes responsive to determining that an instance of a service in the first service chain is inaccessible, dynamically redefining the first service chain to direct flow to an alternative instance of the service.

In another embodiment of the present invention, a computer program product for fulfilling a service chain request is provided. The computer program product includes one or more computer readable storage media and program instructions stored on the one or more computer readable storage media. The program instructions include program instructions to collect network data of a plurality of instances of services and connections between the plurality of instances of services. The program instructions further include program instructions to receive a service chain request requiring a first service chain. The program instructions further include responsive to determining that an instance of a service in the first service chain is inaccessible, dynamically redefining the first service chain to direct flow to an alternative instance of the service.

In yet another embodiment of the present invention, a computer system for fulfilling a service chain request is provided. The computer system includes one or more computer processors, one or more computer readable storage media, and program instructions stored on the one or more computer readable storage media for execution by at least one of the one or more processors. The program instructions include program instructions to collect network data of a plurality of instances of services and connections between the plurality of instances of services. The program instructions further include program instructions to receive a service chain request requiring a first service chain. The program instructions further include responsive to determining that an instance of a service in the first service chain is inaccessible, dynamically redefining the first service chain to direct flow to an alternative instance of the service.

DETAILED DESCRIPTION

Embodiments of the present invention recognize that instances of a service in a service chain can be overloaded (e.g., with many flow entries). For example, a computing node responsible for compression can be overloaded with many flow entries and sending data packets to that instance of service may result in unwanted delay. A different computing node offering an alternative instance of the same service (e.g., compression), in a geographically different location, can sit idle with little to no installed flow entries. Thus, sending the data packet to the different computing node providing the alternative instance of the same service can alleviate delay that might occur due to overloaded computing nodes. Embodiments of the present invention provide efficient solutions for making an SDN controller adaptive to changing conditions of a service chain infrastructure spanning dispersed geographic locations. In this manner, as discussed in greater detail in this specification, embodiments of the present invention can be used to calculate an optimal service chain that excludes overloaded computing nodes in the service chain based, at least in part, on bandwidth availability, latency, processing power, and traffic.

Figure 1:
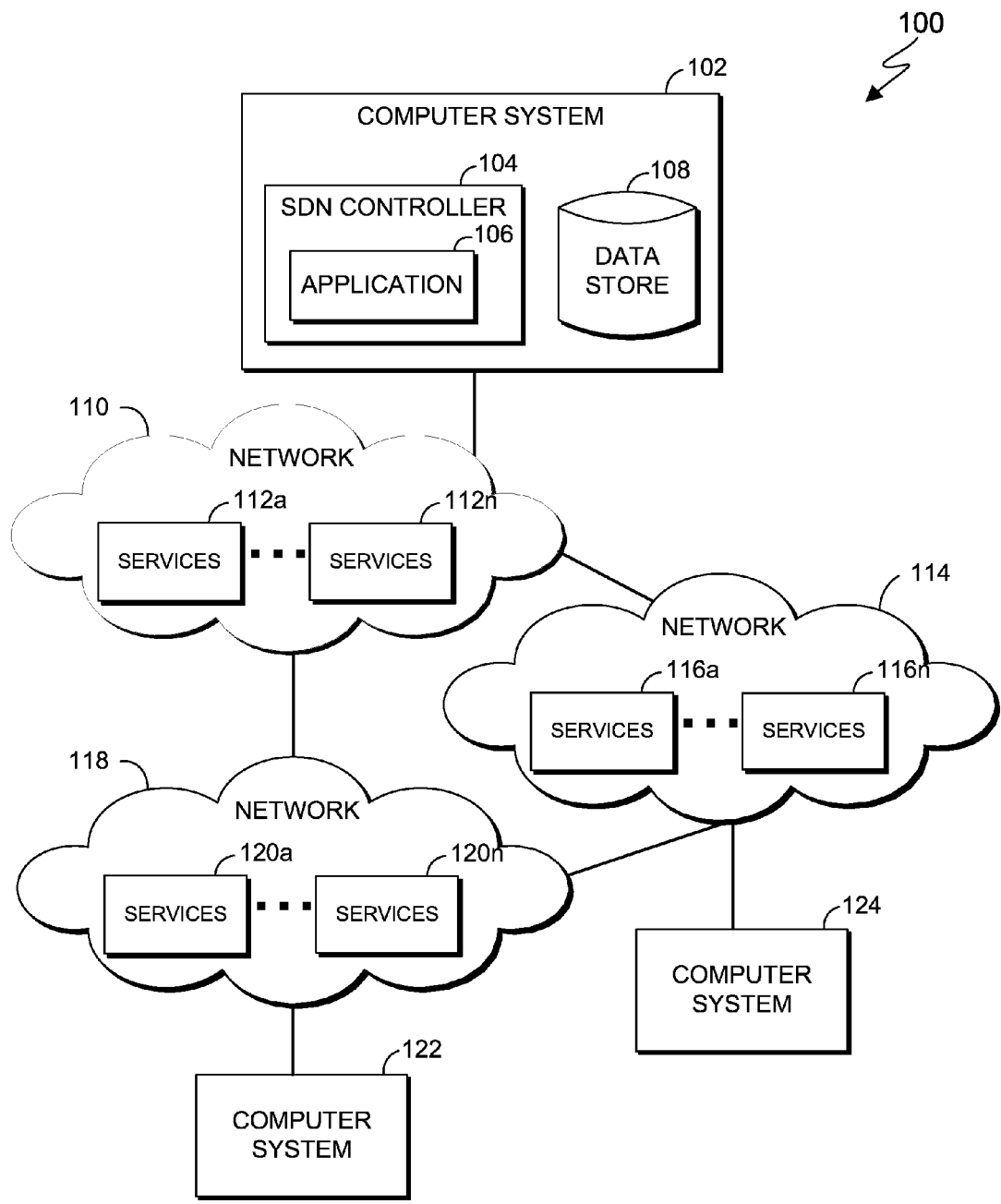
FIG. 1 is a functional block diagram illustrating a computing environment, in accordance with an embodiment of the present invention.

FIG. 1 is a functional block diagram of a computing environment 100, in accordance with an embodiment of the present invention. Computing environment 100 includes a computer system 102, a computer system 122, and a computer system 124, interconnected via an underlay networks, 110, 114, and 116. Computer system 102, computer system 122, and computer system 124 can be desktop computers, laptop computers, server computers, or any other computer systems known in the art. In certain embodiments, computer system 102, computer system 122, and computer system 124 represent computer systems utilizing clustered computers and components to act as a single pool of seamless resources when accessed through networks 110, 114, and 116. For example, such embodiments may be used in data center, cloud computing, storage area network (SAN), and network attached storage (NAS) applications. In certain embodiments, computer system 102, computer system 122, and computer system 124 represent virtual machines. In general, computer system 102, computer system 122, and computer system 124 are representative of any electronic devices, or combination of electronic devices, capable of executing machine-readable program instructions, as described in greater detail with regard to FIG. 5.

Network 110, network 114, and network 118 include one or more respective services 112a-n, 116a-n, and 120a-n where services 112a-n reside on network 110, services 116a-n reside on network 114, and services 120a-n reside on network 118. Network 110, network 114, and network 118 can be, for example, a local area network (LAN), a wide area network (WAN) such as the Internet, or a combination of the two, and include wired, wireless, or fiber optic connections. Network 110, network 114, and network 118 can be dispersed in geographically different locations. For example, network 110, network 114, and network 118 can each be in different areas of a region, in different regions, or any combination of the two. In general, network 110, network 114, and network 118 can be any combination of connections and protocols that will support communications between computer system 102, services 112a-n, 116a-n, and 120a-n, computer system 122, and computer system 124, in accordance with a desired embodiment of the invention.

Services 112a-n, services 116a-n, and services 120a-n are one or more data processing services. For example, services 112a-n, 116a-n, and 120a-n, can be network devices that offer a plurality of instances of particular services (e.g., firewall, compression, encryption, decryption, decompression, intrusion detection, load balancer, network address translation, etc.) to be performed on data packets that are received and transmitted through the network devices en route from a source computer system to an intended destination computer system. The term "service chain", as used herein, refers to a specific sequence of networks (e.g., network 110, network 114, and network 118) providing particular services (e.g., firewall, compression, encryption, decryption, decompression, intrusion detection, load balancer, network address translation, etc.) to be performed on data packets being transmitted towards their intended destinations. For example, a service chain can include a sequence of networks comprising network 110, followed by network 114, and followed by network 118, where services 112a-n of network 110 perform compression services, services 116a-n of network 114 perform encryption services, and services 120a-n of network 118 perform decryption services.

Services 112a-n, services 116a-n, and services 120a-n represent different instances of particular services that can be in different areas of a region, in different regions, or any combination of the two. In this embodiment, each respective group of services on a particular network (e.g., services 112a-n on network 110, services 116a-n on network 114, and services 120a-n on network 118) can be configured to perform the same service. For example, service 112a, service 112b, and service 112c can be configured to encrypt data packets. In another example, service 116a, service 116b, and service 116c can be configured for compression, and so on for each respective group of services. In other embodiments, subgroups of services can be configured on each particular network (e.g., a subgroup of services 112a-n on network 110 can be configured for encryption, while another subgroup of services 112a-n on network 110 can be configured for compression). For illustrative purposes, this embodiment may be discussed with respect to services 112a-n, services 116a-n, and services 120a-n as having the same number of instances of services, it being understood that each of services 112a-n, services 116a-n, and services 120a-n can have a different number of instances of services.

Each of services 112a-n, services 116a-n, and services 120a-n includes a respective flow entry manager (not shown) which interacts with an application 106 (e.g., through a software or hardware switch) and installs flow entries on respective services 112a-n, services 116a-n, and services 120a-n. The term "flow entry", as used herein, refers to one or more rules and/or instructions that direct a service on how and where to transmit data packets. Each respective flow entry manager is capable of receiving data packets from, and sending data packets to, one or more services until the data packets reach their final destination (e.g., from computer system 122 to computer system 124).

Each respective flow entry manager can be configured to execute networking functions of their respective network. In an embodiment, each respective flow entry manager can broadcast network data for their respective services. The term "network data", as used herein, refers to details of respective services and the connections between them. For example, each respective flow entry manager can broadcast network data comprising, the network address of a service (e.g., the IP address), the Media Access Control (MAC) address of the service, the computing power of the service, the number of flow entries supported by the service (e.g., 100 entries), the amount of flow entries currently installed on the service, and the bandwidth and latency of their respective networks. In other embodiments, SDN controller 104 can receive details for respective instances of a service from a user.

Computer system 102 includes SDN controller 104 and data store 108. SDN controller 104 manages flow entries of services 112a-n, services 116a-n, and services 120a-n of respective networks 110, 114, and 118 based on communications protocols. Communications protocols, for example, can allow SDN controller 104 to remotely add, modify, and remove packet matching rules and actions, which allows SDN controller 104 to access and control services 112a-n, services 116a-n, and services 120a-n. SDN controller 104 may have a full view of services 112a-n in network 110, services 116a-n in network 114, and services 120a-n in network 118. For illustrative purposes, this embodiment may be discussed with respect to computer system 102 facilitating sending and receiving packets of data along a service chain comprising one or more services 112a-n, 116a-n, and 120a-n, between computer system 122 and computer system 124, it being understood that each of computer systems 102, 122, and 124 can facilitate sending and receiving packets of data from one or more components in computing environment 100.

SDN Controller 104 includes application 106. Application 106 detects services 112a-n, services 116a-n, and services 120a-n and maps all of the possible combinations of one or more instances of these services through which data packets can be sent (i.e., data paths) to satisfy a requested service chain, along with weighting data for the services and the connections between them. In this embodiment, application 106 generates a weighted graph, where services 112a-n, 116a-n, and 120a-n are represented as nodes of the graph, and the connections between the services are represented as edges of the graph. In other embodiments, application 106 can map the possible combinations of instances of these services in other forms, such as one or more tables or lists.

The weighting data is based on usage details of services 112a-n, 116a-n, and 120a-n and the connections between them. The term "usage details", as used herein, refers to metrics used to measure service use (e.g., the computing power of the service, the number of flow entries supported by the service and the amount of flow entries currently installed on the service, and/or the bandwidth and latency of their respective networks) and alerts SDN controller 104 that a service is overloaded. In this embodiment, an instance of a service assigned a higher weight indicates that a data packet would be processed faster on that particular instance of the service (e.g., because that instance has more available computing resources and/or a greater capacity) than on another instance of the service having a lower weight. Similarly, an edge (e.g., the connection between services 112a and 116a) assigned a higher weight indicates that a data packet would be transmitted faster on that particular connection (e.g., because that connection supports faster transmission rates and/or is less utilized) than an edge assigned a lower weight. In this embodiment, a numerical weighting scale is used, where lower numbers represent lesser weights and higher numbers represent greater weights. In other embodiments, any desirable weighting scale can be used. Furthermore, in this embodiment, the weighting of particular instances of services and particular connections can change dynamically according to changes in operating conditions and usage. For example, as a particular instance of a service becomes more utilized and approaches a specified capacity, the weighting of that instance of the service may be decreased.

In this embodiment, the usage details that are used to weight the nodes (i.e., services 112a-n, 116a-n, and services 120a-n) include the computing power of the respective instances of services, the number of flow entries supported by the respective instances of services, and the amount of flow entries currently installed on the respective instances of services. In other embodiments, other usage details can be used to weight the nodes. In this embodiment, the usage details that are used to weight the edges (i.e., the connection between instances of services) include bandwidth and network latency. In other embodiments, other usage details can be used to weight the edges.

In this embodiment, application 106 can further specify thresholds for each metric used to measure usage details (e.g., computing power usage, flow entries that can be installed on a particular service, bandwidth usage, and latency). For example, application 106 can specify that a threshold of greater than or equal to 50% of the maximum computing power usage, flow entries that can be installed, bandwidth availability, and latency. Responsive to determining that the service has reached the specified threshold, application 106 assigns the lowest weight to that instance of service, which can effectively exclude that service from an optimal data path calculation that fulfills the service chain request. In other embodiments, the specified threshold can be configured to any user-defined threshold.

Figure 4:
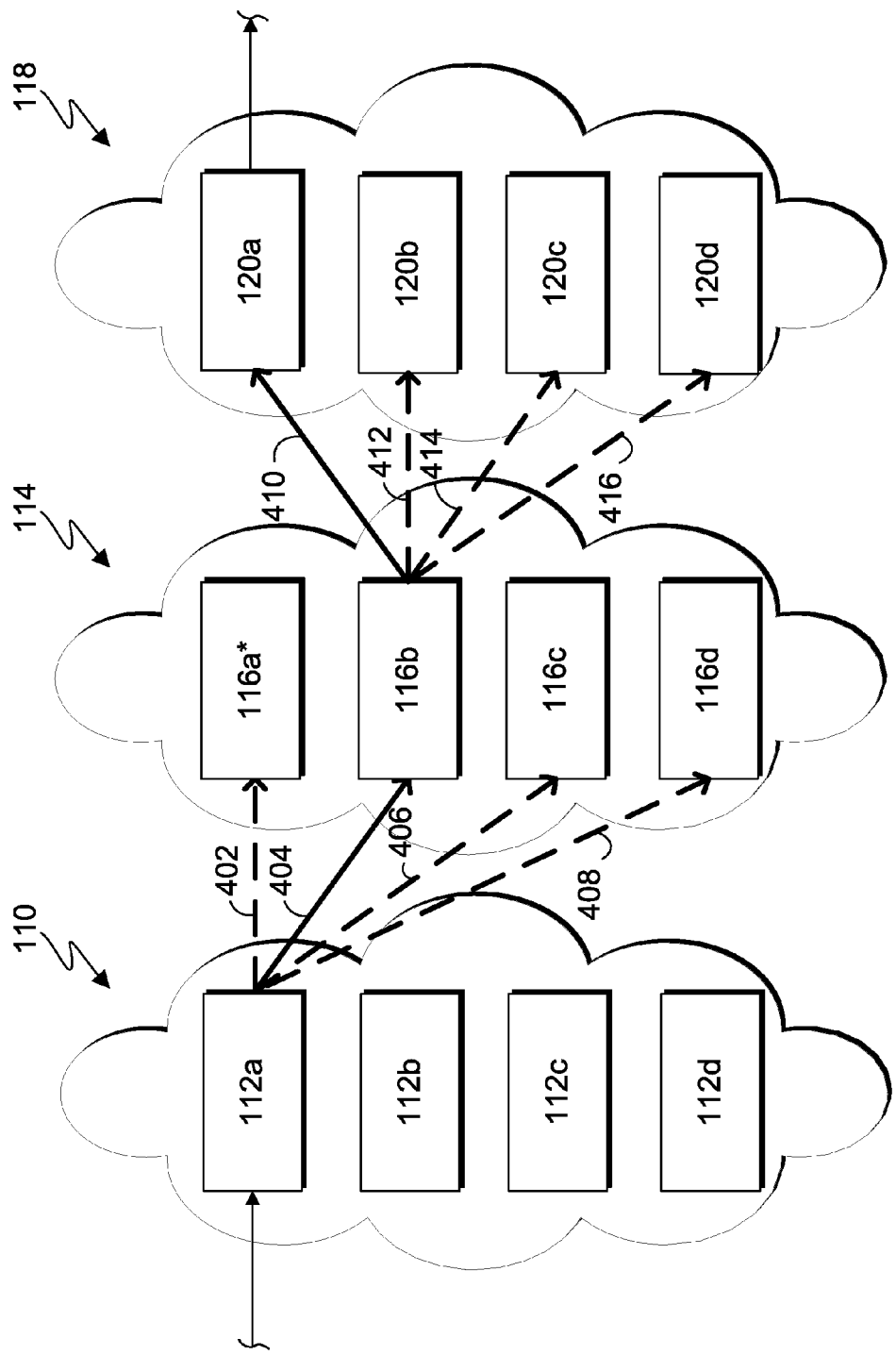
FIG. 4 is a block diagram of example data paths through which data packets can be forwarded, in accordance with an embodiment of the present invention.

Application 106 also calculates an optimal data path that fulfills the service chain request, based on the constructed weighted graph, as shown in greater detail in FIG. 4. Application 106 updates the generated weighted graph representing the possible combinations of instances of service and connections between them that a data packet can take each time a data path is calculated that fulfills a service chain request to reflect the most current usage details of services 112a-n, services 116a-n, and services 120a-n.

SDN controller 104 can call application 106 to dynamically redefine a service chain responsive to detecting an instance of a service being inaccessible. In this embodiment, SDN controller 104 can detect an instance of a service that is part of a service chain as inaccessible when the instance of a service broadcasts an error notification to SDN controller 104 indicating it is overloaded, or when a threshold of greater than or equal to 50% of the maximum computing power usage, flow entries that can be installed, bandwidth availability, and latency is reached. In this embodiment, SDN controller 104 redefines a service chain by removing the inaccessible instance of a service from the service chain and selecting an alternative instance of the same service based on the constructed weighted graph, as shown in greater detail in FIG. 3.

Data store 108 stores the graph created and maintained by application 106. Data store 108 can be implemented using any storage media known in the art.

Figure 2:
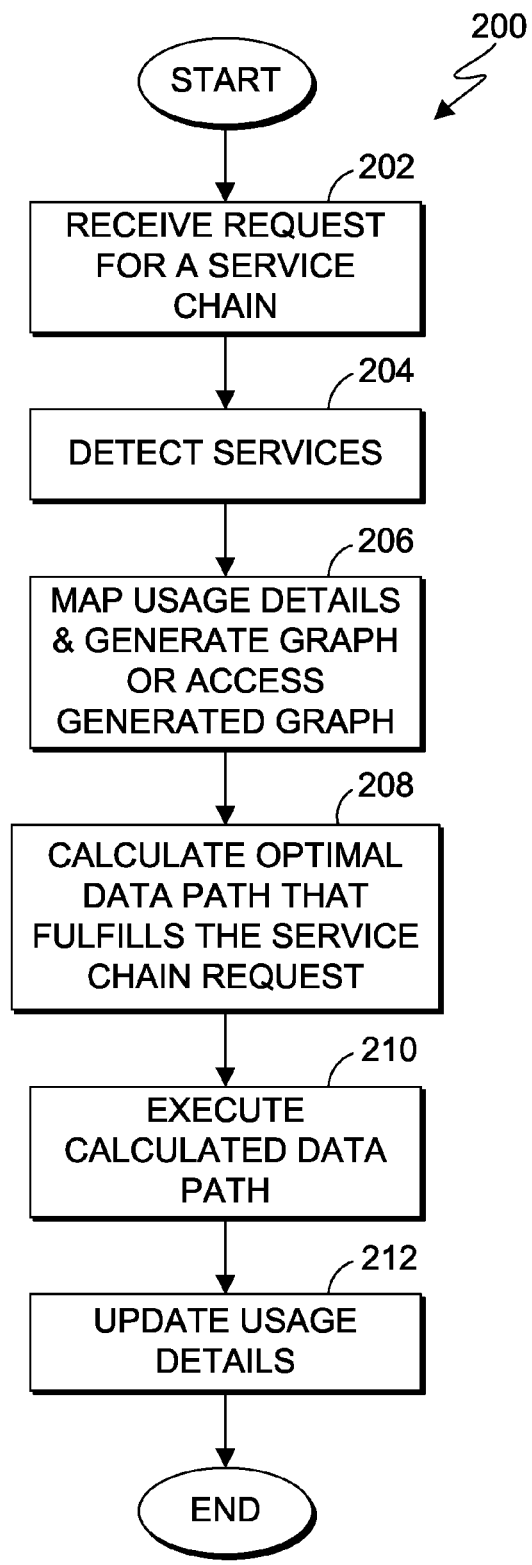
FIG. 2 is a flowchart illustrating operational steps for calculating a data path that fulfills a service chain request, in accordance with an embodiment of the present invention.

FIG. 2 is a flowchart 200 illustrating operational steps for calculating a data path that fulfills a service chain request, in accordance with an embodiment of the present invention.

In step 202, application 106 receives a request for a service chain. In this embodiment, application 106 receives a request for a service chain from SDN controller 104. For example, SDN controller 104 can specify the service chain to be firewall, compression, encryption, decompression, and decryption, in that order. In other embodiments, application 106 can receive a request for desired services from one or more components in computing environment 100.

In step 204, application 106 detects services 112a-n, services 116a-n, and services 120a-n. In this embodiment, application 106 receives a broadcast from respective services 112a-n, services 116a-n, and services 120a-n, which allows application 106 to detect their presence. The broadcast allows services 112a-n, services 116a-n, and services 120a-n to communicate information about themselves to application 106. In this embodiment, the broadcast comprises the following: the network address of a service, the MAC address of the service, the computing power of the service, the number of flow entries supported by the service, and the amount of flow entries currently installed on the service. For example, the broadcast can contain the following information: network Id is 192.168.100.3, the MAC address of service 112a is 00: 02: E3: 07: 25: 44, computing power of service 112a is one billion floating-point operations per second (flops), the number of flow entries supported is 100, and the number of installed flow entries is 10. In other embodiments, application 106 can query each of services 112a-n, services 116a-n, and services 120a-n for the information contained in the broadcast.

In step 206, application 106 maps the usage details of network 110, network 114, and network 118, and their respective instances of services (e.g., services 112a-n, services 116a-n, and services 120a-n) and generates a graph, where instances of services are represented as nodes of the graph and connections between instances of services are represented as edges of the graph. Application 106 can alternatively access a previously generated graph (e.g., previously generated for a prior request for a service chain). In this embodiment, application 106 generates a graph comprising all possible combinations of a one or more instances of services from the broadcast that application 106 received from each of services 112a-n, 116a-n, and 120a-n, along with weighting data based on the usage details, as previously discussed. Each combination represents a possible data path from source to destination, through instances of services that fulfill the requested service chain.

For example, application 106 can generate a graph comprising all possible combinations of services 112a and 112b of a firewall service, services 116a-c of a compression service, and services 120a and 120b of a decompression service and the connection points between each of services 112a and 112b, services 116a-c, and services 120a and 120b (e.g., twelve possible data paths for firewall, compression, and decompression services).

In this embodiment, each usage detail associated with a node (i.e., an instance of a service) is assigned a point value that is used to determine the weight assigned to that instance of a service. In this embodiment, the usage details that are used to weight the nodes (i.e., services 112a-n, 116a-n, and services 120a-n) include the computing power usage of the respective instances of services, and the maximum capacity of flow entries currently installed on the respective instances of services. The highest total point value is assigned the highest weight, which, as previously discussed, indicates that instance has more available computing resources and/or greater capacity. In other embodiments, other usage details can be used to weight the nodes.

For example, the usage details could indicate that service 112a has a maximum capacity of ten flow entries, with a last known number of installed flow entries of zero, and a CPU usage of 25% of its total computing power. In this example, application 106 would assign service 112a a point value of 10 for its flow entry capacity and a 5 for its computing power usage. Application 106 then adds the point values assigned to service 112a to yield a total point value of 15. The usage details could further indicate that service 112b also has a maximum capacity of ten flow entries, with a last known number of installed flow entries of 5, but a CPU usage of 50% of its total computing power. In this example, application 106 can assign service 112b a point value of 10 for its flow entry capacity and a point value of 2.5 for its CPU usage. Application 106 then adds the point values assigned to service 112b to yield a total point value of 12.5. Accordingly, in this example, service 112a is weighted more highly than service 112b.

Similarly, each usage detail associated with an edge (i.e. connections between the instances of services) is assigned a point value that is used to determine the weight assigned to that edge. In this embodiment, the usage details that are used to include bandwidth and network latency. The highest total point value is assigned the highest weight, which, as previously discussed indicates that connection supports faster transmission rates and/or is less utilized. In other embodiments, other usage details can be used to weight the edges.

In this embodiment, application 106 can be configured to assign a point value to nodes and/or edges that effectively excludes those nodes and/or edges from a data path calculation to fulfill a service chain request. For example, application 106 can assign the lowest possible point value to a node that satisfies the 50% threshold of its maximum computing power usage and maximum amount of flow entries that can be installed, or an edge that satisfies the 50% threshold of its bandwidth availability and network latency.

In step 208, application 106 calculates an optimal data path for packets that fulfills the service chain request. In this embodiment, application 106 calculates an optimal data path for packets that fulfills the service chain request by identifying a data path having the greatest cumulative weight. The term, "greatest cumulative weight", as used herein, refers to the sum total of the weight of nodes (i.e., instances of services) and edges (i.e., connections between the instances of service). For example, an optimal data path selected could be data path A (e.g., from 112a to 116b, and from 116b to 120a) because the cumulative weight of 112a, 116b, 120a, the connection between 112a and 116b, and the connection between 116b to 120a exceeds the cumulative weights of other data paths that could be used to fulfill the service chain request.

In another example, a requested service chain can be firewall, compression, and intrusion detection, in that order. Application 106 accesses the graph and identifies there are two data paths that include the sequence of instances of services that fulfills the service chain request: data path A (e.g., from service 112a to service 116a, and from service 116a to service 120a) or data path B (e.g., from service 112a to service 116b, and from service 116b to service 120a). Application 106 identifies that service 112a has an assigned weight of 10, that the connection between service 112a to service 116a has an assigned weight of 10, that service 116a has an assigned weight of 2, that the connection between service 116a and service 120a has an assigned weight of 5, and that service 120a has an assigned weight of 10. Application 106 then adds the weights associated with the corresponding nodes and connections for data path A to yield a cumulative weight of 37.

Using the graph to calculate the cumulative weight of data path B, application 106 identifies that service 112a has an assigned weight of 10, that the connection between service 112a to service 116b has an assigned weight of 9, that service 116b has an assigned weight of 5, that the connection between service 116b and service 120a has an assigned weight of 10, and that service 120a has an assigned weight of 10. Application 106 then adds the weights associated with the corresponding nodes and connections for data path B to yield a cumulative weight of 44. Accordingly, application 106 would select data path B as the optimal data path that fulfills the service chain request.

In this embodiment, where an instance of a service satisfies its configured threshold (i.e., becomes overloaded), application 106 can exclude that instance of the service from future calculated data paths, invalidate that instance of the service from all previously executed data paths, and generate an optimal data path for fulfilling the requested service chain using the remaining instances of that service. For example, a requested service chain can be firewall, compression, and intrusion, in that order. The previously installed flow for that service chain may have sent the data packets to service 112*a* (firewall) located in region 1, service 116*b* (compression) also located in region 1, and service 120*c* (intrusion detection) located in region 3. Responsive to receiving an error notification from service 116*b* indicating that service 116*b* has satisfied its specified threshold, application 106 can access the graph of usage details and assign the lowest weight to service 116*b*, effectively excluding service 116*b* from future optimal data path calculations to fulfill service chain requests.

Application 106 can then identify, from the weighted graph, service 116*c* as an alternative instance of the same service for compression, and select service 112*a*, service 116*c*, and service 120*c* as the optimal data path. Similarly, application 106 can also remove service 116*b* from any existing data paths. In this embodiment, for example, application 106 can transmit instructions to flow managers on instances of all other services to remove a service that satisfies a specified threshold (e.g., an overloaded instance of service, such as service 116*b*) from their flow tables, and replace the removed instance of service with an alternative instance of the same service.

In step 210, application 106 executes the calculated data path. In this embodiment, application 106 executes the calculated data path by transmitting the calculated data path to SDN controller 104. SDN controller 104 installs the appropriate flow entries on the services in the calculated data path, such that data packets can then be transmitted along the calculated data path to fulfill the requested service chain.

In step 212, application 106 updates the graph and usage details. In this embodiment, application 106 updates usage details for the instances of services in the calculated data path used to fulfill the service chain request. For example, if the calculated data path used to fulfill the service chain request includes services 112*a*, 116*b*, and 120*c*, application 106 updates the usage details by increasing the count of flow entries installed on those services by one. In this embodiment, application 106 also updates usage details of connections between instances of services to reflect any changes to bandwidth and network latency.

Accordingly, in this embodiment, application 106 calculates an optimal data path that fulfills a service chain request and also avoids one or more instances of services (and/or connections therebetween) that could cause a delay between transmitting data packets through the service chain. In this manner, embodiments of the present invention can help improve data transfer speeds and make an SDN controller adaptive to changing conditions of a service chain infrastructure spanning dispersed geographic locations.

Figure 3:
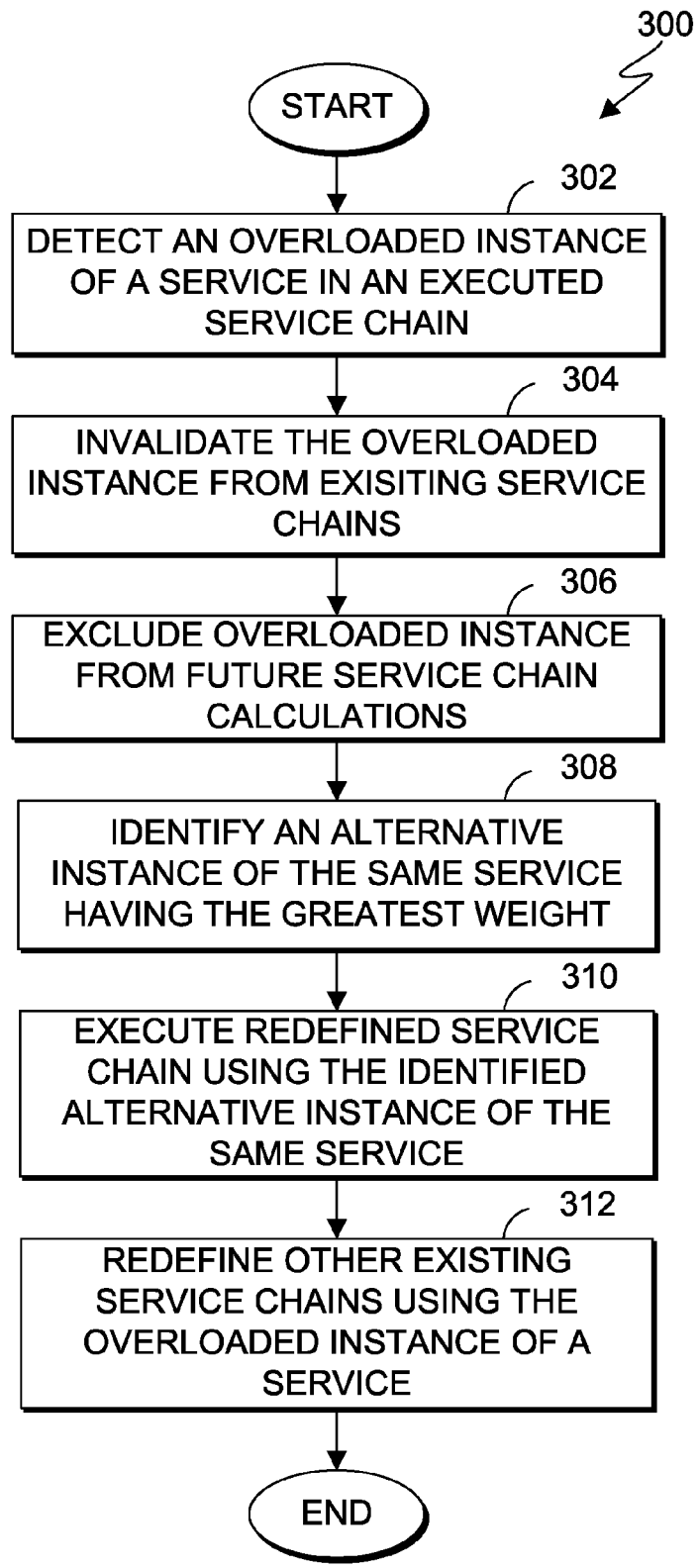
FIG. 3 is a flowchart illustrating operational steps for redefining service chains that contain an overloaded instance of a service, in accordance with an embodiment of the present invention.

FIG. 3 is a flowchart 300 illustrating operational steps for redefining service chains that contain an overloaded instance of a service, in accordance with an embodiment of the present invention. For example, the operational steps of flowchart 300 can be performed at step 208 of flowchart 200.

In step 302, SDN controller 104 detects an overloaded instance of a service in an executed service chain. In this embodiment, SDN controller 104 can detect an overloaded instance of a service (i.e., an inaccessible instance of a service) responsive to receiving an error notification from an instance of service indicating that it has become overloaded or otherwise non-functional or inaccessible. In this embodiment, SDN controller 104 can also detect an overloaded instance of a service responsive to determining that one or more usage details of the service have reached a specified threshold (i.e., becomes overloaded).

In step 304, SDN controller 104 invalidates the overloaded instance of a service from service chains. In this embodiment, SDN controller 104 invalidates the overloaded instance of a service from the executed service chain and other existing service chains by transmitting instructions to flow managers on instances of all other services to remove the overloaded instance of the service from their flow tables, which effectively removes the overloaded instance from the executed service chain and other existing service chains by preventing data packets from being transmitted to the overloaded instance of the service.

In step 306, SDN controller 104 transmits instructions to application 106 to exclude the overloaded instance from future service chain calculations. In this embodiment, application 106 can access the graph of usage details and assign the lowest weight to the overloaded instance of the service, which effectively excludes the overloaded instance of the service from future service chain calculations to fulfill service chain requests.

In step 308, SDN controller 104 identifies an alternative instance of the same service having the greatest weight. In this embodiment, SDN controller 104 identifies an alternative instance of the same service having the greatest weight by accessing the weighted graph. For example, an executed service chain for compression, encryption, and decryption could have an optimal data path from services 112*a* to 116*a*, and from services 116*a* to service 120*a*. In this example, SDN controller 104 receives an error notification from 116*a* indicating that 116*a* has become overloaded. Responsive to receiving the error notification, SDN controller 104 invalidates that overloaded instance (e.g., service 116*a*), transmits instructions to application 106 to exclude service 116*a* from future data path calculations, and identifies the alternative instances of the same service as services 116*b-d*. SDN controller 104 can further identify that service 116*c* has the greatest assigned weight (e.g., because that instance has more available computing resources and/or a greater capacity) by accessing the weighted graph generated in step 206 of flowchart 200.

In step 310, SDN controller 104 executes the redefined service chain using the identified alternative instance of the same service. In this embodiment, SDN controller 104 executes the redefined service chain by installing flow entries on respective flow managers of the instances of services in the redefined service chain.

In step 312, SDN controller 104 redefines other existing service chains that contained the overloaded instance of a service. In this embodiment, SDN controller 104 redefines other existing service chains that included the overloaded instance of a service responsive to receiving a query for an alternative instance of the service from flow entry managers. For example, flow entry managers of respective instances of services that removed the overloaded instance of a service (responsive to receiving instructions from SDN controller 104 to remove the overloaded instance) from their flow tables would not know where to forward data packets. These flow entry managers could then query SDN controller 104 for an alternative instance of the overloaded instance of service. In this embodiment, responsive to receiving a query from flow entry managers, SDN controller 104 redefines the service chain by identifying alternative instances of the same service having the greatest weight, and executes the redefined service chain by transmitting instructions to the flow entry managers of the instances of services to install the alternative instance of the same service in their respective flow tables, as previously discussed in steps 308 and 310.

FIG. 4 is a block diagram of example data paths through which data packets can be forwarded, in accordance with an embodiment of the present invention. In this example, application 106 receives a service chain request for data packets to be transmitted from computer system 122 to computer system 124 that includes firewall, compression, and intrusion detection services, in that order. In this example, services 112a-d are instances of the firewall service, services 116a-d are instances of the compression service, and services 120a-d are instances of the intrusion detection service, where network 114, and network 118, are each located in a different geographic location. The dotted lines represent possible data paths between services 112a-d, 116a-d, and 120a-d that fulfill the service chain request. The solid line represents the calculated optimal data path that fulfills the service chain request.

In this embodiment, application 106 calculates the optimal data path for packets as being from service 112a to service 116b, and from service 116b to service 120a, because this data path possesses the greatest cumulative weight. That is, the cumulative weight of 112a, 116b, 120a, edge 404, and edge 410 exceeds the cumulative weights of other data paths that could have been used to fulfill the service chain request.

In this example, application 106 received an error notification from service 116a, and determined that service 116a is overloaded (denoted by an asterisk). Application 106 then invalidates service 116a from data path calculations for fulfilling the service chain request.

Application 106 calculates an optimal data path to fulfill the service chain request by accessing the weighted graph, identifying weights for alternative instances of the compression services, and identifying the data path with this greatest cumulative weight containing the alternative instances for the compression services.

In this example, application 106 selects service 112a because as between service 112a-d, service 112a has the highest assigned weight of 10. Application 106 then identifies services 116b-d as available instances of the same compression service. Application 106 then identifies that services 116b-d have the same weight assigned (e.g., 9) to each of them. As between services 116b-d, application 106 would select service 116b because edge 404 between service 112a and 116b had the highest weight (e.g., 10, indicating that a data packet would be processed faster on that particular connection (e.g., because that connection supports faster transmission rates and/or is less utilized). Edges 406 and 408 had assigned weights of 5 and 6, respectively. Edge 402 had an assigned weight of 10 but would no longer be selected because this connection would send the data packet to service 116a which has been determined as an overloaded instance of a compression service.

Application 106 then identifies the assigned weights for the connections to services 120a-d as well as the weights for each of services 120a-d. For example, edges 410-416 could have the following weights: 8, 3, 5, and 4. Application 106 selects edge 410 because edge 410 has the highest weight.

Continuing the example, application 106 then identifies the weights for services 120a-b as 8, 9, 6, and 5. As between service 120a and service 120b, application 106 would select service 120a as the instance of intrusion detection service even though service 120b had the higher weight because edge 410 had a higher weight.

To complete the optimal data path calculation, application 106 sums the weights assigned to the nodes and connections that could fulfill the service chain request. The cumulative weight of 112a, 116b, 120b, edge 404, and edge 412 is 41 (e.g., 10+9+9+10 3). The cumulative weight of 112a, 116b, 120c, edge 404, and edge 414 is 40 (e.g., 10+9+6+10+5). The cumulative weight of 112a, 116b, 120d, edge 404, and edge 416 is 38 (e.g., 10+9+6+10+4). The cumulative weight of 112a, 116b, 120a, edge 404, and edge 410 is 45 (e.g., 10+9+8+10+8) and exceeds the cumulative weights of other data paths that could have fulfilled the service chain request. It is therefore selected as the optimal data path that fulfills the service chain request.

Figure 5:
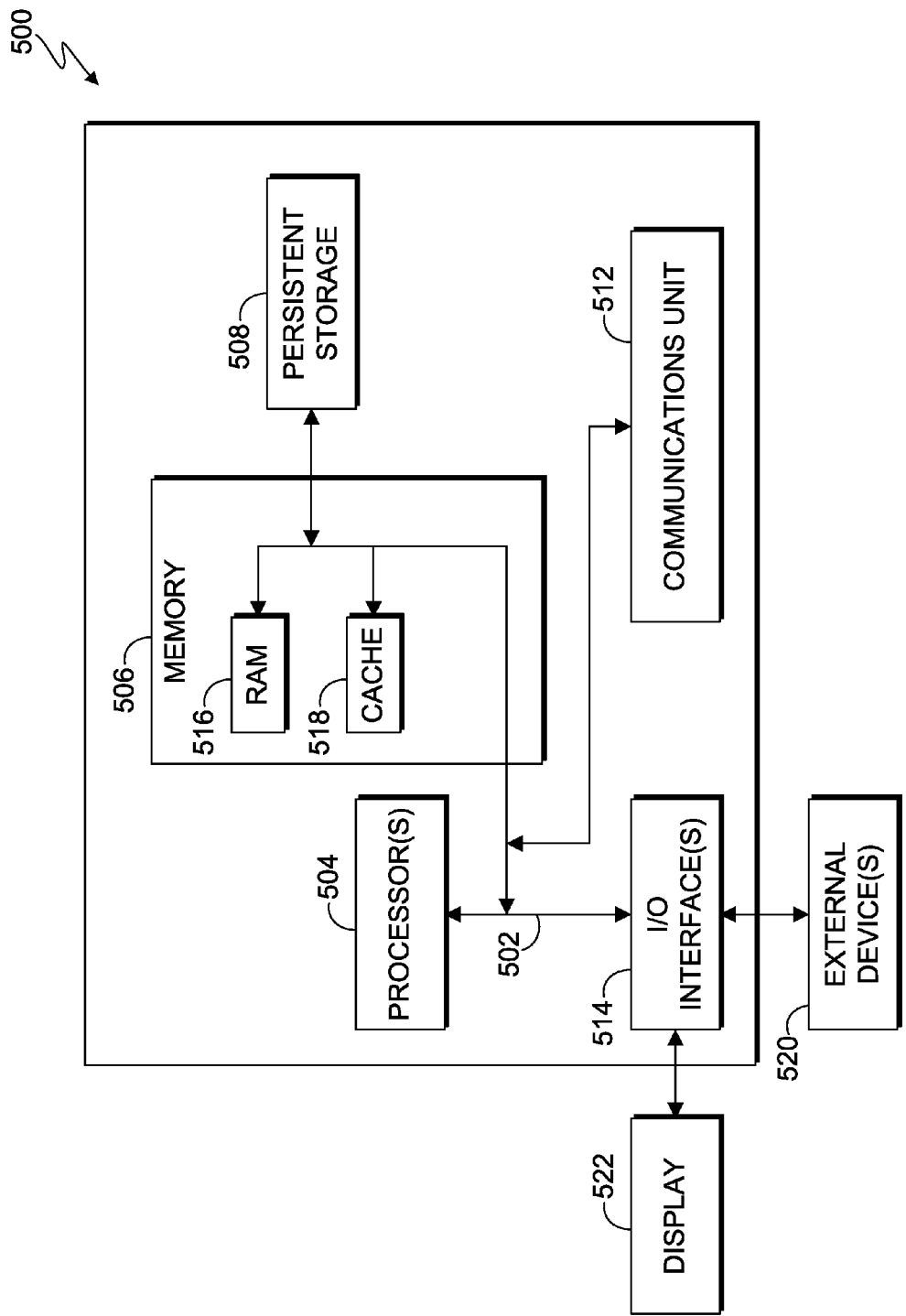
FIG. 5 is a block diagram of internal and external components of the computer systems of FIG. 1, in accordance with an embodiment of the present invention.

FIG. 5 is a block diagram of internal and external components of a computer system 500, which is representative the computer systems and switches of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506. Such software can be SDN controller 104, and application 106, and/or any or all of flow entry managers.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 110, network 114, and/or network 118). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 102 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for fulfilling a service chain request, the method comprising:
    collecting, by one or more computer processors, network data of a plurality of instances of services and connections between the plurality of instances of services;
    receiving, by one or more computer processors, a service chain request requiring a first service chain;
    responsive to determining that an instance of a service in the first service chain is inaccessible, dynamically redefining, by one or more computer processors, the first service chain to direct flow to an alternative instance of the service; and
    installing the redefined first service chain to direct flow to the alternative instance of the service.

2. The method of claim 1, wherein responsive to determining that an instance of a service in the first service chain is inaccessible, dynamically redefining, by one or more computer processors, the first service chain to direct flow to an alternative instance of the service comprises:
    invalidating, by one or more computer processors, the inaccessible instance of the service in the first service chain;
    excluding, by one or more computer processors, the inaccessible instance of the service in the first service chain from future service chain calculations; and
    identifying, by one or more computer processors, an alternative instance of the service in the plurality of instances of services.

3. The method of claim 2, wherein invalidating, by one or more computer processors, the inaccessible instance of the service in the first service chain comprises:
    transmitting, by one or more computer processors, an instruction to one or more of the plurality of instances of services to remove the inaccessible instance of the service from flow tables of the one or more of the plurality of instances of services.

4. The method of claim 3, further comprising:
    receiving, by one or more computer processors, a query from a first instance of service having a first flow table from which the inaccessible instance of the service was removed; and
    responsive to receiving the query, transmitting, by one or more computer processors, an instruction to the first instance of service to install the alternative instance of the service in the first flow table.

5. The method of claim 2, wherein identifying, by one or more computer processors, an alternative instance of the service in the plurality of instances of services comprises:
    generating, by one or more computer processors, a weighted graph, wherein instances of services that are assigned a greater point value are weighted more heavily in the weighted graph than instances of services that are assigned a lesser point value, and connections that are assigned a greater point value are weighted more heavily in the weighted graph than connections that are assigned a lesser point value; and
    selecting, by one or more computer processors, an alternative instance of the service having a greatest weight in the weighted graph.

6. The method of claim 1, wherein determining that an instance of a service in the first service chain is inaccessible comprises:
    receiving, by one or more computer processors, an error message from a first instance of service of the plurality of instances of services; and
    responsive to receiving the error message, determining, by one or more computer processors, that the first instance of service is inaccessible.

7. The method of claim 1, wherein determining that an instance of a service in the first service chain is inaccessible comprises:
    specifying, by one or more computer processors, a threshold for network data of a first instance of service of the plurality of instances of services; and
    responsive to determining that usage details of the first instance of service satisfy the specified threshold, determining, by one or more computer processors, that the first instance of service is inaccessible.

8. A computer program product for fulfilling a service chain request, the computer program product comprising:
    one or more computer readable storage media and program instructions stored on the one or more computer readable storage media, the program instructions comprising:
        program instructions to collect network data of a plurality of instances of services and connections between the plurality of instances of services;
        program instructions to receive a service chain request requiring a first service chain;
        program instructions to, responsive to determining that an instance of a service in the first service chain is inaccessible, dynamically redefine the first service chain to direct flow to an alternative instance of the service; and program instructions to install the redefined first service chain to direct flow to the alternative instance of the service.

9. The computer program product of claim 8, wherein the program instructions to, responsive to determining that an instance of a service in the first service chain is inaccessible, dynamically redefine the first service chain to direct flow to an alternative instance of the service comprise:
program instructions to invalidate the inaccessible instance of the service in the first service chain;
program instructions to exclude the inaccessible instance of the service in the first service chain from future service chain calculations; and
program instructions to identify an alternative instance of the service in the plurality of instances of services.

10. The computer program product of claim 9, wherein the program instructions to invalidate the inaccessible instance of the service in the first service chain comprise:
program instructions to transmit an instruction to one or more of the plurality of instances of services to remove the inaccessible instance of the service from flow tables of the one or more of the plurality of instances of services.

11. The computer program product of claim 10, wherein the program instructions stored on the one or more computer readable storage media further comprise:
program instructions to receive a query from a first instance of service having a first flow table from which the inaccessible instance of the service was removed; and
program instructions to, responsive to receiving the query, transmit an instruction to the first instance of service to install the alternative instance of the service in the first flow table.

12. The computer program product of claim 9, wherein the program instructions to identify an alternative instance of the service in the plurality of instances of services comprise:
program instructions to generate a weighted graph, wherein instances of services that are assigned a greater point value are weighted more heavily in the weighted graph than instances of services that are assigned a lesser point value, and connections that are assigned a greater point value are weighted more heavily in the weighted graph than connections that are assigned a lesser point value; and
program instructions to select an alternative instance of the service having a greatest weight in the weighted graph.

13. The computer program product of claim 8, wherein the program instructions to determine that an instance of a service in the first service chain is inaccessible comprise:
program instructions to receive an error message from a first instance of service of the plurality of instances of services; and
program instructions to, responsive to receiving the error message, determine that the first instance of service is inaccessible.

14. The computer program product of claim 8, wherein the program instructions to determine that an instance of a service in the first service chain is inaccessible comprise:
program instructions to specify a threshold for network data of a first instance of service of the plurality of instances of services; and
program instructions to, responsive to determining that usage details of the first instance of service satisfy the specified threshold, determine that the first instance of service is inaccessible.

15. A computer system for fulfilling a service chain request, the computer system comprising:
one or more computer processors;
one or more computer readable storage media; and
program instructions stored on the one or more computer readable storage media for execution by at least one of the one or more computer processors, the program instructions comprising:
program instructions to collect network data of a plurality of instances of services and connections between the plurality of instances of services;
program instructions to receive a service chain request requiring a first service chain;
program instructions to, responsive to determining that an instance of a service in the first service chain is inaccessible, dynamically redefine the first service chain to direct flow to an alternative instance of the service; and
program instructions to install the redefined first service chain to direct flow to the alternative instance of the service.

16. The computer system of claim 15, wherein the program instructions to, responsive to determining that an instance of a service in the first service chain is inaccessible, dynamically redefine the first service chain to direct flow to an alternative instance of the service comprise:
program instructions to invalidate the inaccessible instance of the service in the first service chain;
program instructions to exclude the inaccessible instance of the service in the first service chain from future service chain calculations; and
program instructions to identify an alternative instance of the service in the plurality of instances of services.

17. The computer system of claim 16, wherein the program instructions to invalidate the inaccessible instance of the service in the first service chain comprise:
program instructions to transmit an instruction to one or more of the plurality of instances of services to remove the inaccessible instance of the service from flow tables of the one or more of the plurality of instances of services.

18. The computer system of claim 17, wherein the program instructions stored on the one or more computer readable storage media further comprise:
program instructions to receive a query from a first instance of service having a first flow table from which the inaccessible instance of the service was removed; and
program instructions to, responsive to receiving the query, transmit an instruction to the first instance of service to install the alternative instance of the service in the first flow table.

19. The computer system of claim 16, wherein the program instructions to identify an alternative instance of the service in the plurality of instances of services comprise:
program instructions to generate a weighted graph, wherein instances of services that are assigned a greater point value are weighted more heavily in the weighted graph than instances of services that are assigned a lesser point value, and connections that are assigned a greater point value are weighted more heavily in the weighted graph than connections that are assigned a lesser point value; and program instructions to select an alternative instance of the service having a greatest weight in the weighted graph.

20. The computer system of claim 15, wherein the program instructions to determine that an instance of a service in the first service chain is inaccessible comprise:
program instructions to receive an error message from a first instance of service of the plurality of instances of services; and
program instructions to, responsive to receiving the error message, determine that the first instance of service is inaccessible.

* * * * *